United States Patent Office 2,849,356
Patented Aug. 26, 1958

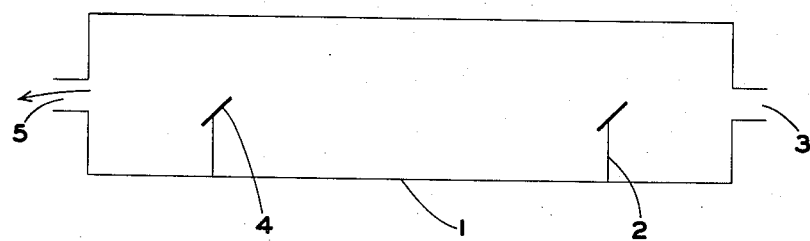
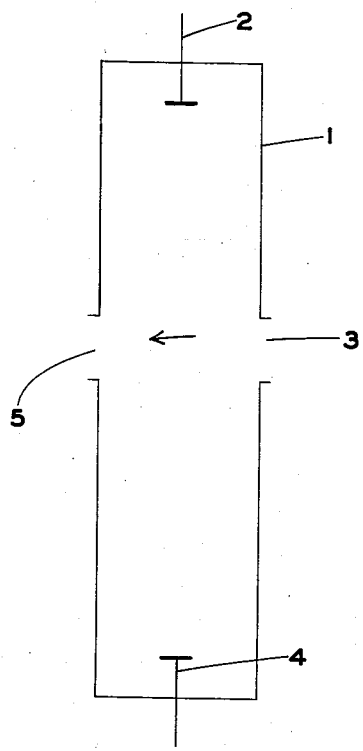
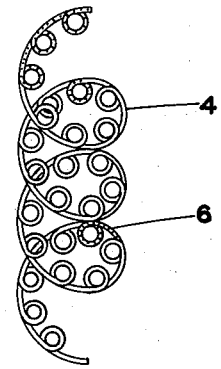
INVENTOR:
JEAN P. MANION

2,849,356

CHEMICAL SYNTHESIS

Jean P. Manion, New Haven, Conn., assignor to Olin Mathieson Chemical Corporation, East Alton, Ill., a corporation of Virginia Application December 8, 1954, Serial No. 473,813

1 Claim. (Cl. 204—177)

This invention relates generally to the synthesis of chemical compounds and more particularly to an apparatus and method for synthesizing chemical compounds by electrically exciting gaseous materials.

It has been proposed heretofore to make hydrazine and other chemical compounds by electrically exciting a gaseous material in a suitable glow discharge apparatus. Electrical discharge methods have the advantage that extremely high temperatures may be applied to individual molecules in the material to permit the rapid attainment of high energy levels without subjecting the resulting product to such temperatures for any substantial period of time. This is of particular importance in the manufacture of hydrazine and some other chemical compounds but heretofore known processes for making hydrazine from ammonia have not been economically feasible because only a very small percentage of the total ammonia decomposed is converted into hydrazine, the yield of hydrazine produced per kilowatt hour (kw. h.) of electrical energy utilized is low and large and complicated apparatus is required. Likewise, the yield of other compounds such as nitric oxide and hydrogen peroxide produced by glow discharge methods has been too low to be commercially feasible.

Accordingly, it is an object of this invention to provide an apparatus and method for making hydrazine and other chemical compounds which is devoid of the foregoing disadvantages. Another object of this invention is to provide an electrical discharge apparatus and method for converting gaseous materials into chemical compounds in higher yields per kilowatt hour of electrical energy utilized than heretofore obtained by glow discharge techniques. A more specific object of the invention is to provide a method and apparatus for making hydrazine from ammonia by glow discharge techniques in which a larger percentage of total ammonia decomposed is converted into hydrazine than by former techniques.

Other objects will become apparent from the following description and with reference to the accompanying drawing, in which:

Figure 1 illustrates diagrammatically an electrical discharge vessel as one embodiment of the invention;

Figure 2 is a diagrammatic illustration of another embodiment of the invention providing means for flow of the gas transversely through the apparatus; and Figure 3 is an enlarged illustration of an embodiment of a cathode for apparatuses such as illustrated in Figures 1 and 2.

Generally speaking, the foregoing objects as well as others are accomplished in accordance with this invention by providing a glow discharge apparatus having a low photoelectric work function cathode for electrically exciting a gaseous reactant with the discharge between the cathode and a suitable anode while the gaseous reactants are at a pressure below atmospheric. The invention provides a method and apparatus particularly advantageous for synthesizing hydrazine from ammonia but the apparatus can also be utilized for effecting electro-chemical transformation of other gaseous reactants to form compounds such as, for example, for the preparation of hydrogen peroxide by electrically exciting water vapor, and for preparing nitric oxide by electrically exciting a mixture of nitrogen and oxygen, or for many other reactions which occur in the positive column of the glow discharge.

The cathode regions such as the negative glow and the Crookes dark space of a glow discharge are essential parts of any self-sustaining discharge. The positive column, on the other hand, is not ordinarily a vital feature of glow discharge mechanism but in the synthesis of some materials such as hydrazine for example, the positive column is essential and the cathode regions contribute little toward the conversion of the reactant to the desired product. From a utilitarian viewpoint it is extremely desirable to eliminate all sources of energy dissipation which do not lead directly to hydrazine production. It has been found in accordance with this invention that the energy dissipation in the cathode region is reduced from that of a conventional glow discharge by using a low work function cathode without the discharge characteristics in the positive column being deleteriously affected. When ordinary cathode materials are used the cathode voltage fall is large and increases rapidly as discharge current is increased. With the cathode of this invention, cathode fall is small at small currents and decreases rapidly as discharge current is increased. For example, at a current of 5 milliamperes in apparatus having a cesium-oxide coated tungsten cathode the voltage fall was found to be 160 and with a current of 40 milliamperes the cathode voltage fall was only 70. In apparatus having a tantalum cathode, the cathode voltage fall was 530 with a current of 5 milliamperes and about 1000 with a current of 40 milliamperes.

When the current is increased in a discharge operating with the low work function cathode, discharge stability increases and no cathode heating is observed. In contrast, with discharges using an ordinary cathode such as platinum, tantalum, copper, or aluminum,, cathode heating and sputtering occur at currents significantly above 10 milliamperes and if provision is not made for cathode cooling, arcing occurs. Currents much greater than 10 milliamperes can be utilized if a low work function cathode is provided without the cathode becoming heated to the temperature where it cannot longer be used without cooling and without excessive sputtering or arcing of the discharge. For example, it was found in operation of a glow discharge apparatus in the synthesis of hydrazine that discharge currents of 80 milliamperes and even higher could be utilized to advantage when a cesium-oxide coated tungsten wire cathode was used while a current of 10 milliamperes caused excessive heating, arcing and sputtering with a tungsten cathode not having the low work function coating.

As it is desired to minimize the energy dissipation in the cathode region, cathodes which are suitable for the purposes of this invention are those which lower the normal cathode voltage fall, which is a quantity linearly related to the energy dissipation in the cathode region. It has been found that cathodes possessing a low work function achieve this result. Any cathode having a photoelectric work function of about 2.5 electron volts or less is suitable for the purposes of this invention. For example, alkaline earth metals, alkali metals and oxides thereof such as lithium, sodium, potassium, rubidium, cesium, barium, barium oxide, zirconium oxide, cesium oxide, strontium and mixtures thereof are advantageous as the cathode of a glow discharge apparatus. The cathode may be formed of the low work function material or it may be formed from any suitable material and coated with the low work function material.

Referring to Figure 1, ammonia at a pressure of 5 millimeters of mercury was passed longitudinally through a glow discharge apparatus 1 entering at 3. The ammonia was flowing at a rate of about 0.065 mole per 100 seconds, and the total residence time of the ammonia in the apparatus 1 before it emerged from exit 5 was 0.019 second. The interelectrode distance was 10 centimeters. A voltage of 500 with a current of 8.3 milliamperes was required to sustain the electrode discharge. The ammonia as it passed through apparatus 1 was electrically excited by the glow discharge between cathode 2 and tantalum anode 4. The cathode 2 was made of tungsten wire 0.002 inch in diameter, coiled into a double helical coil, such as illustrated in Figure 3, the diameter of the outer coil being 0.013 inch. The coil was coated with a mixture of barium oxide and zirconium oxide, designated as numeral 6 in Figure 3, which has a photoelectric work function of less than 2.5 electron volts. It was found that 62 percent of the ammonia decomposed emerged as hydrazine at 5 and that the yield of hydrazine was 7.6 grams per kw. h. of electrical energy utilized.

The barium oxide and zirconium oxide coated cathode 2 was replaced with a tantalum cathode in a second example and it was found that an applied voltage of 990 with a current of 5 milliamperes was required to sustain an electrical discharge between cathode 2 and anode 4. The interelectrode distance was 10 centimeters. Ammonia was electrically excited in apparatus 1 under conditions identical with those of the foregoing example except for the required change in voltage and current and it was found that only 40% of the ammonia decomposed converted into hydrazine by the discharge between tantalum anode 4 and cathode 2. The yield of hydrazine was about 3.9 grams per kw. h.

The effect of increasing the current is illustrated in another example identical to the foregoing except that an applied voltage of 590 and a current of 20 milliamperes were utilized. Of the ammonia decomposed 72 percent was converted into hydrazine and the yield of hydrazine per kw. h. was 11.6 grams.

In another example, ammonia at a pressure of 5 millimeters was passed longitudinally through a glow discharge apparatus 1 entering at 3. The ammonia was flowing at a rate of about 0.337 mole per 100 seconds and the total residence time of the ammonia in the apparatus 1 before it emerged from exit 5 was 0.0018 second. The interelectrode distance was 5 centimeters. A voltage of 585 with a current of 6.3 milliamperes was required to sustain the electrical discharge. The low work function cathode described above in Example 1 was used. It was found 80 percent of the ammonia decomposed emerged as hydrazine at 5 and that the yield of hydrazine was 23 grams per kw. h. of electrical energy utilized. The increased yield obtained in this example over that of the first example described hereinbefore is believed due primarily to the shorter residence time of only 0.0018 second instead of 0.019 second. The apparatus of Figure 2 providing for transverse flow of the reactant through apparatus 1 is ideally suited for the purpose of exposing the reactant to the discharge between low work function cathode 2 and anode 4. The reactant enters at 3 and emerges from the apparatus at 5.

Although the process and apparatus are described in considerable detail in the foregoing, variations can be made within reasonable limits without deleteriously affecting the yield of hydrazine or other chemical compounds. It is preferred, however, that the pressure level in vessel 1 be maintained between about 3 and about 50 millimeters of mercury in order to obtain a yield of product within the range of the examples. The temperature within vessel 1 is usually ambient temperature although, if desired, some increase in temperature can be tolerated. Indeed, it is sometimes advantageous to heat the cathode to a temperature of about 600–1000° C. The applied voltage and current are of course to be regulated such that only that voltage required to sustain a discharge at the desired current between the anode and cathode is utilized. Either direct or alternating current may be utilized but direct current was used in each of the specific examples described in the foregoing. The anode may be made of any suitable material such as, for example, platinum, tantalum and the like. Although a double helically coiled cathode has been found particularly advantageous, cathodes having other shapes such as a flat faced or a conical faced cathode can be utilized.

It is apparent from the results of the foregoing experiments that the objectives of this invention are achieved and that a method for making hydrazine and other chemical compounds with a higher yield of product based on both the amount of raw material utilized and kw. h. input required to sustain an electrical discharge is provided.

The process and apparatus have been described in detail in the foregoing only for the purpose of illustration and various modifications may be made therein by those skilled in the art without departing from the spirit and scope of this invention except as limited by the appended claim.

Having thus described the invention what is claimed and desired to be secured by Letters Patent is:

The method of preparing hydrazine which comprises passing ammonia at a pressure of substantially 3 to 50 millimeters of mercury through the positive column of an electrical glow discharge, said glow discharge being formed between an anode and a cathode, and said cathode having a surface of material chosen from the group consisting of an alkali metal, an alkaline earth metal, and an oxide thereof.

References Cited in the file of this patent

Westhaver: Journal Physical Chemistry, vol. 37 (1933), pp. 897–905.